(12) United States Patent
Ogawa et al.

(10) Patent No.: US 10,094,497 B2
(45) Date of Patent: Oct. 9, 2018

(54) TUBE WITH COUPLING

(71) Applicants: Yodogawa Hu-Tech Co., Ltd., Suita-shi, Osaka (JP); CKD Corporation, Komaki, Aichi (JP)

(72) Inventors: Katsumi Ogawa, Suita (JP); Yujiro Deguchi, Suita (JP); Masayoshi Kaneko, Suita (JP); Ryuma Kumo, Suita (JP); Hideyuki Takeda, Aichi (JP)

(73) Assignees: Yodogawa Hu-Tech Co., Ltd., Suita-shi, Osaka (JP); CKD Corporation, Komaki, Aichi (JP)

( * ) Notice: Subject to any disclaimer, the term of this patent is extended or adjusted under 35 U.S.C. 154(b) by 0 days.

(21) Appl. No.: 15/370,199

(22) Filed: Dec. 6, 2016

(65) Prior Publication Data
US 2017/0167648 A1    Jun. 15, 2017

(30) Foreign Application Priority Data
Dec. 10, 2015 (JP) ................. 2015-241269

(51) Int. Cl.
*F16L 23/024* (2006.01)
*F16L 23/028* (2006.01)
(Continued)

(52) U.S. Cl.
CPC .......... *F16L 23/024* (2013.01); *F16L 23/028* (2013.01); *F16L 47/14* (2013.01);
(Continued)

(58) Field of Classification Search
CPC ... F16L 23/028; F16L 23/0286; F16L 23/024; F16L 23/026
(Continued)

(56) References Cited

U.S. PATENT DOCUMENTS 4,900,063 A * 2/1990 Baarfusser .......... F16L 23/0286
285/24
2009/0091125 A1* 4/2009 Takeda .................... B25B 27/10
285/88

FOREIGN PATENT DOCUMENTS

EP           0330946 A1 * 9/1989 .......... F16L 23/0286
JP           63-197617 A    8/1988
(Continued)

OTHER PUBLICATIONS

Japanese Patent Office, "Office Action" from counterpart JP Application No. 2015-241269 (no English language translation available), 4 pp., Apr. 11, 2017.

*Primary Examiner* — James M Hewitt, II
(74) *Attorney, Agent, or Firm* — Eckert Seamans Gherin & Mellott, LLC

(57) ABSTRACT

The present invention relates to a tube with coupling according to which liquid leakage and the like can be suppressed as much as possible when couplings are connected. A tube with coupling (10) according to the present invention is a tube with coupling (10) obtained by forming a coupling (30) on a leading end portion (22) of a tube (20) through injection molding, and the leading end portion (22) of the tube (20) is arranged at a position set back from a leading end portion (32) of the coupling (30), at least a portion of the leading end portion (22) of the tube (20) being covered by the coupling (30). It is desirable that a flange (36) is provided so as to protrude outward at a position set back from the leading end portion (32) of the coupling (30) and the leading end portion (22) of the tube (20) is arranged at a position set further back from the flange (36).

3 Claims, 2 Drawing Sheets

(51) Int. Cl.
 *F16L 47/14* (2006.01)
 *F16L 23/036* (2006.01)
 *F16L 23/18* (2006.01)
 *B29L 31/24* (2006.01)
 *B29C 45/14* (2006.01)

(52) U.S. Cl.
 CPC .. *B29C 45/14336* (2013.01); *B29C 45/14598* (2013.01); *B29C 45/14836* (2013.01); *B29L 2031/24* (2013.01); *F16L 23/036* (2013.01); *F16L 23/18* (2013.01); *F16L 2201/40* (2013.01)

(58) Field of Classification Search
 USPC .......................................................... 285/416
 See application file for complete search history.

(56) References Cited

FOREIGN PATENT DOCUMENTS

| | | |
|---|---|---|
| JP | 4088873 B2 | 2/2004 |
| JP | 2004-225917 A | 8/2004 |
| JP | 2005-125757 A | 5/2005 |
| JP | 2007-138980 A | 6/2007 |
| WO | WO 2004057225 A1 * | 7/2004 .......... F16L 23/0286 |

* cited by examiner

TUBE WITH COUPLING

BACKGROUND OF THE INVENTION

Field of the Invention

The present invention relates to a tube having a leading end provided with a coupling, and more specifically relates to a tube with coupling according to which liquid leakage and the like can be suppressed as much as possible when couplings are connected to each other.

Description of Related Art

Tubes made of fluororesin are used to supply and transport a fluid for raw materials, a fluid for cleaning, a fluid for fuel, and the like in various types of apparatuses for manufacturing, cleaning, assembling, and the like in the field of electronics such as semiconductors, the field of medicine, the field of biotechnology, and the like.

A tube with coupling, the coupling being provided on a leading end of the tube, has been proposed as such a tube (e.g., see Patent Document 1). This tube with coupling is not used in the above-mentioned fields, but the coupling is injection molded so that the leading end of the tube and the leading end of the coupling are in alignment on the same plane.

PRIOR ART DOCUMENTS

Patent Documents

Patent Document 1: Japanese Patent No. 4088873

However, the leading end of the tube is formed by cutting, and therefore sometimes recessions and protrusions are present on the cut surface and the cut surface is not orthogonal but is tilted. In such a case, when couplings are connected to each other, a gap is formed between the opposing leading ends of the tube, and there is a risk that liquid leakage and the like will occur.

An object of the present invention is to provide a tube with coupling according to which liquid leakage and the like can be suppressed as much as possible when couplings are connected to each other.

SUMMARY OF THE INVENTION

The tube with the coupling according to the present invention is a tube with coupling, a coupling being formed on a leading end portion of a tube by performing injection molding, wherein
the leading end portion of the tube is arranged at a position set back from a leading end portion of the coupling, at least a portion of the leading end portion of the tube being covered by the coupling.

It is preferable that a flange is provided to as to protrude outward at a position set back from the leading end portion of the coupling, and the leading end portion of the coupling is arranged at a position set further back from the flange.

It is preferable that a recession is formed on the outer circumference of the coupling, between the leading end portion of the tube and the flange.

Effects of the Invention

With the tube with coupling according to the present invention, it is possible to use a configuration in which the leading end portion of the tube is not exposed at the leading end of the tube with coupling, due to the coupling being formed so as to cover at least a portion of the leading end portion of the tube. Accordingly, even if recessions, protrusions, and tilting are present at the leading end of the tube, the leading end of the tube with coupling is the coupling, and the coupling can be formed through injection molding. For this reason, there is little dimensional variation and a highly-accurate connection surface shape can be obtained. Accordingly, when tubes with couplings are connected to each other directly or using joints or the like, the leading end portions of the couplings are the connection surfaces, and the leading end portions of the tubes are not the connection surfaces, and therefore there is no risk that liquid leakage and the like will occur even if recessions, protrusions, and tilting are present at the leading end portions of the tubes.

Also, the coupling covers not only the circumferential surface of the tube, but at least a portion of the leading end portion of the tube, and thus it is possible to obtain a long fusion margin between the tube and the coupling and to increase the bond strength, and liquid leakage and the like can be suppressed as much as possible.

DETAILED DESCRIPTION OF THE INVENTION

Hereinafter, a tube with coupling 10 according to an embodiment of the present invention will be described with reference to the drawings.

Figure 1:
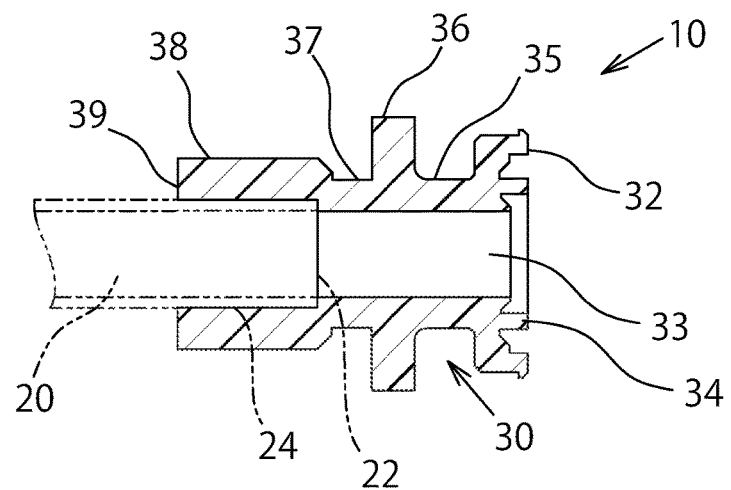
FIG. 1 is a perspective view of a tube with coupling according to an embodiment of the present invention.

FIG. 1 is a cross-sectional view of the tube with coupling 10 according to an embodiment of the present invention. As shown in the drawing, the tube with coupling 10 includes a hollow tube 20 and a coupling 30 provided at a leading end portion 22 of the tube 20. Also, tubes with couplings 10, 10 can be connected to each other directly or via a joint 40 shown in FIG. 2, for example.

The tube with coupling 10 can be used to supply or transport a fluid for a raw material, a fluid for cleaning, a fluid for fuel, or the like in an apparatus for manufacturing, cleaning, assembling, or the like. A liquid or gas can be given as an example of the fluid that passes through the interior of the tube with coupling 10, and powder or particles are mixed in the liquid or gas according to need. These liquids may be combustible or non-combustible.

A heat-meltable material such as a fluororesin material can be employed in the tube 20. As this type of fluororesin material, tetrafluoroethylene-perfluoroalkyl vinyl ether copolymer (PFA) is preferable, and other examples of fluororesin materials include tetrafluoroethylene-hexafluoropropylene copolymer (FEP), tetrafluoroethylene-hexafluoropropylene-vinylidene fluoride ternary copolymer, and the like. Note that the materials and characteristics of the tube 20 are not limited to the above description.

The tube 20 can have a diameter of 3 mm to 60 mm, a thickness of 0.5 mm to 5 mm, and a length of 0.05 m to 200 m, for example. Also, for the tube 20, various shapes can be selected, such as a straight pipe, a spiral pipe, or a bent pipe.

The coupling 30 is formed on the leading end 22 of the tube 20 through injection molding.

A heat-meltable material such as a fluororesin material can be used for the coupling 30. As this type of fluororesin material, tetrafluoroethylene-perfluoroalkyl vinyl ether copolymer (PFA) is preferable, and other examples of fluororesin materials include tetrafluoroethylene-hexafluoropropylene copolymer (FEP), tetrafluoroethylene-hexafluoropropylene-vinylidene fluoride copolymer, and the like. Note that the materials and characteristics of the coupling 30 are not limited to the description above, and it is preferable to employ a material of the same type as that of the tube 20.

As shown in FIG. 1, the coupling 30 covers the circumferential surface 24 near the leading end portion 22 of the tube 20 and at least a portion of the leading end portion 22, and the leading end portion 32 of the coupling 30 protrudes past the leading end portion 22 of the tube 20, or in other words, the leading end portion 22 of the tube 20 is at a position set back from the leading end portion 32 of the coupling 30. Note that "at least a portion of the leading end portion 22" may be the entire surface of the ring-shaped leading end portion 22, or may be only the outer circumferential side of the leading end portion 22 or one or more locations on the leading end portion 22.

Due to the leading end portion 22 of the tube 20 being set back from the leading end portion 32 of the coupling 30, the leading end portion 22 of the tube 20 is not exposed at the leading end that is to be the connection surface of the tube with coupling 10, and the connection surface of the tube with coupling 10 is constituted by the leading end portion 32 of the coupling 30 produced through injection molding. The leading end 32 of the coupling 30 that was produced using injection molding can be given a highly-accurate connection surface shape. Accordingly, when the tubes with couplings 10, 10 are connected to each other directly or using the joint 40, the leading end portion 32 of the coupling 30 is the connection surface, and the leading end portion 22 of the tube 20 is not the connection surface, and therefore there is no risk that liquid leakage and the like will occur, even if recessions, protrusions, and tilting are present at the leading end portion 22 of the tube 20.

Also, with the tube 20, not only the circumferential surface 24, but at least a portion of the leading end portion 22 is fused to the coupling 30, and therefore it is possible to obtain a long fusion margin and increase the bonding strength in comparison to the case where only the circumferential surface 24 is fused to the coupling 30. Accordingly, even if vibration and pressure act on the tube with coupling 10 accompanying conveying of the fluid, it is possible to prevent a gap from occurring between the tube 20 and the coupling 30 and to prevent the coupling 30 from coming off of the tube 20. Note that as shown in FIG. 1, the coupling 30 is formed so as to cover the entire surface of the ring-shaped leading end portion 22 of the tube 20, whereby the tube 20 and a through-hole 33 of the coupling 30 are smoothly connected without a level difference. For this reason, it is possible to suppress the pipe resistance of the fluid passing through the interior.

Figure 2:
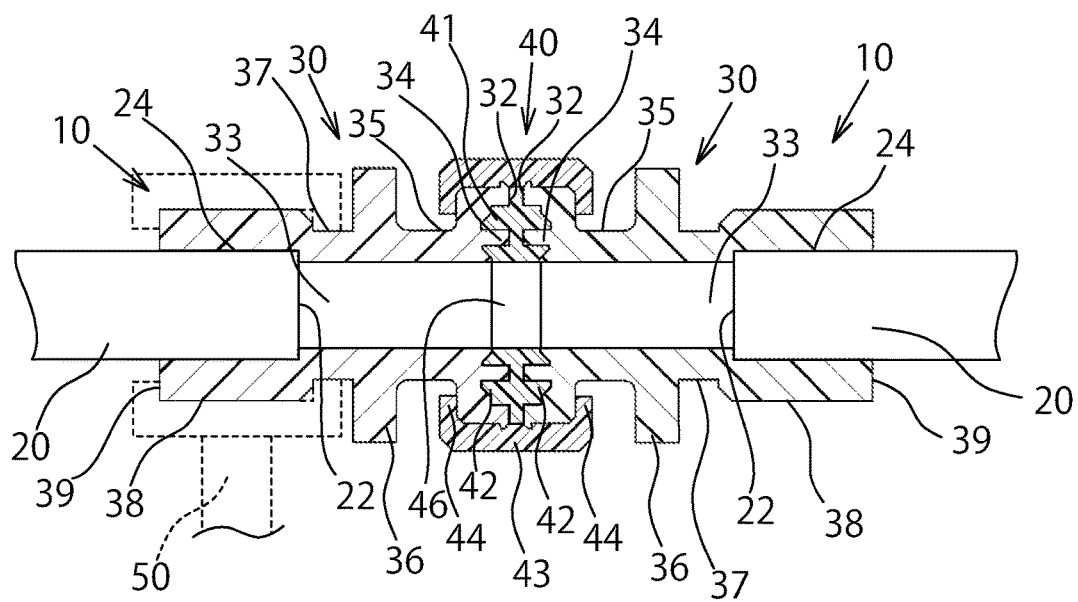
FIG. 2 is a cross-sectional view showing a state in which tubes with couplings according to an embodiment of the present invention are connected to each other with a joint.

To give a more detailed description of the shape of the coupling 30, the coupling 30 has a through-hole 33 formed therein that communicates with the tube 20. Also, in the present embodiment, as shown in FIGS. 1 and 2, the outer circumference of the leading end portion 32 of the coupling 30 widens, and a ring-shaped engaging portion 34 is formed in which an engaged portion 42 of a sealing member 41 (see FIG. 2) included inside of the joint 40 is fit. Also, rearward of the leading end portion 32, a ring-shaped recession 35 is provided on the outer circumference, and a claw piece 44 of a clip 43 included in the joint 40 catches thereon.

On the coupling 30, a flange 36 is provided so as to protrude at a position set back from the above-described first recession 35. The flange 36 can be used for pushing against a jig when connecting the tube with coupling 10.

Also, in the present embodiment, a second recession 37 is formed on the outer circumference at a position set back from the flange 36, and the leading end portion 22 of the tube 20 is bonded to a tubular portion 38 formed at a position set back from the second recession 37. For example, as shown in FIG. 2, the tubular portion 38 can be supported by a support 50 that has a U-shaped cross section and fits over the second recession 37 and a rear end portion 39 of the coupling 30. If the support 50 is configured to support the tube 20 directly, there is a risk that the tube 20 will be worn, but this problem can be eliminated by supporting the coupling 30 as shown in FIG. 2.

As shown in FIG. 2, the tubes with couplings 10, 10 having the above-described configuration can be connected using the ring-shaped joint 40. The joint 40 can be constituted by a ring-shaped sealing member 41 that comes into contact with the leading end portion 32 of the coupling 30 and a clip 43 that fits over the outer circumferences of the leading end portions 32 of the opposing couplings 30 so as to maintain a coupled state. The sealing member 41 has a hole 46 that communicates with the through hole 33 of the coupling 30 and has the ring-shaped engaged portion 42 formed at its circumferential edge. Also, the clip 43 has an approximately U-shaped cross section, and claw pieces 44 are provided so as to protrude on both sides thereof.

As shown in FIGS. 1 and 2, by providing the tubular portion 38 that is bonded with the tube 20 at a position set back from the second recession 37, the tubular portion 38 can be made thicker and thus strengthened. Also, because the tube 20 is not inserted into the leading end portion 32, the first recession 35, the flange 36, and the second recession 37, strength can be obtained without increasing the outer diameters thereof. Due to being able to reduce the outer diameter of the coupling 30, when the tube with coupling 10 is arranged in alignment, the gap between the tubes with couplings 10 can be made narrower, which is advantageous.

Also, the tubes with couplings 10, 10 can be connected with the following procedure.

First, the sealing member 41 is pushed into the leading end portion 32 of the coupling 30 of one tube with coupling 10, and the engaged portion 42 of the sealing member 41 fits onto the engaging portion 34 of the coupling 30. Next, the leading end portion 32 of the coupling 30 of the other tube with coupling 10 is engaged with the sealing member 41 from the opposite side. Then, the clip 43 is attached while the flange 36 is pushed with a jig such that the couplings 30, 30 are in close contact with the sealing member 41, and the claw piece 44 of the clip 43 is fit into the first recession 35 of the coupling 30, whereby the tubes with couplings 10, 10 are connected in an air-tight and fluid-tight manner using the joint 40.

As shown in FIG. 2, the connected tubes with couplings 10, 10 can be connected in an air-tight and fluid-tight manner since the leading end portions 32, 32 of the highly-accurate couplings 30, 30 come into contact with the sealing member 41, and thus it is possible to prevent liquid leakage and the like.

Note that when the connected tubes with couplings 10, 10 are installed in an apparatus for manufacturing, cleaning, assembling, or the like, the coupling 30 can be supported by the support 50, which has a U-shaped cross section, as shown in FIG. 2. Due to the coupling 30 being supported by the support 50, it is possible to suppress wearing of the tube 20 in comparison to the case where the tube 20 is supported by a support.

Figure 3:
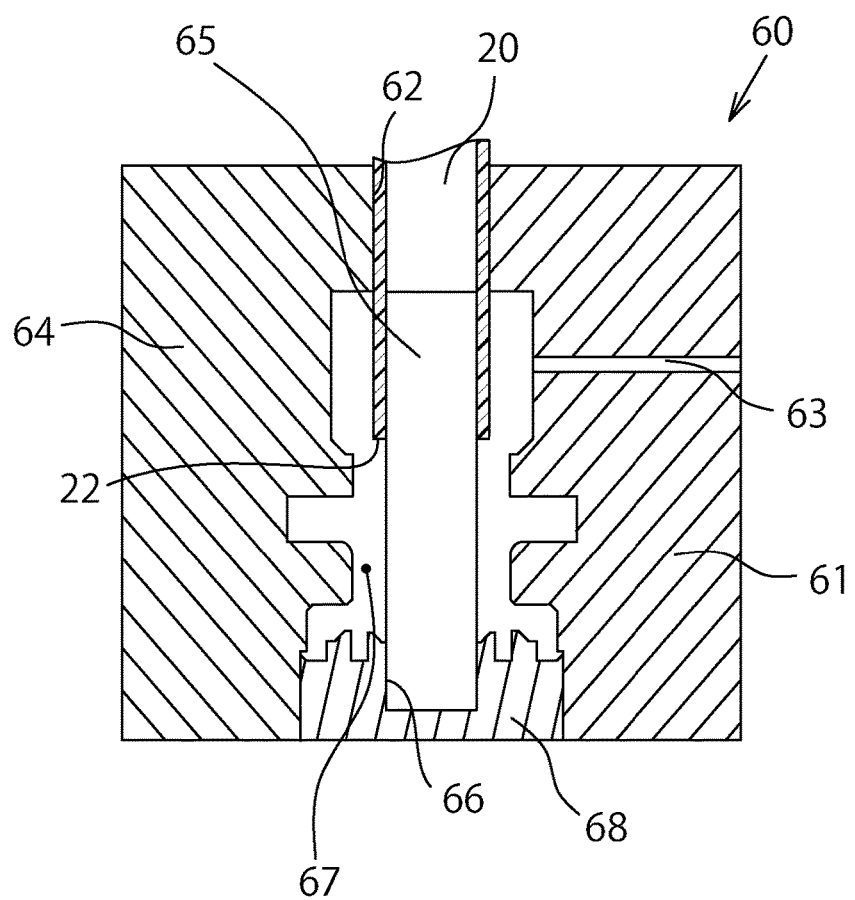
FIG. 3 is diagram illustrating a method for manufacturing a tube with coupling according to an embodiment of the present invention.

With the tube with coupling 10 having the above-described configuration, the coupling 30 can be produced by performing injection molding on the tube 20. For example, as shown in FIG. 3, a metallic mold 60 is composed of a fixed mold 61 and a movable mold 64, which are located respectively on the left side and the right side, and a slide pin 68 that can be brought close to the fixed mold 61 and the movable mold 64 from below, and recessions and protrusions that match the shape of the coupling 30 to be formed are formed in the metallic mold 60. Also, in the fixed mold 61 and the movable mold 64, an insertion hole 62 through which the tube 20 is inserted is formed, and at an opposing position, the slide pin 68 includes a fitting hole 66 into which a pin 65 is fit. The tube 20 is inserted into the pin 65 and is held inside of the metallic mold 60.

A sprue 63 that communicates with a cavity 67 inside of the metallic mold 60 is formed in the fixed mold 61. As shown in FIG. 3, it is preferable that the sprue 63 is provided at a position that is near the location of fusing with the tube 20.

In the metallic mold 60 having the above-described configuration, the tube 20 is fit into the pin 65, the tube 20 and the pin 65 are set in the metallic mold 60 in its expanded state, and the metallic mold 60 is closed. Then, pre-heating is performed on the tube 20 as needed and molten resin is poured into the cavity 67 through the sprue 63, whereby the coupling 30, which is fused with the tube 20, can be formed so as to cover the circumferential surface 24 of the tube 20 and the entire surface of the leading end portion 22.

Note that if only the outer circumference of the leading end portion 22 of the tube 20 is to be covered by the coupling 30, it is sufficient to form a step portion on the pin 65 and perform injection molding so that only the outer circumference of the leading end portion 22 of the tube 20 is exposed in the cavity 67.

The description of the foregoing embodiment is for describing the present invention, and should not be interpreted as limiting or restricting the scope of claims of the present invention. Furthermore, it goes without saying that the configurations of the constituent elements of the present invention are not limited to those in the embodiment, and that various modifications are possible within the technical scope of the claims.

For example, as long as the coupling 30 protrudes past the leading end portion 22 of the tube 20 and has a shape covering the circumferential surface 24 of the tube 20 and at least a portion of the leading end portion 22, there is no limitation on the shape of the leading end portion 32 and the shapes of the flange 36 and the like, and there is no limitation regarding the existence or non-existence thereof in the above-described embodiment.

Also, the tubes with couplings 10 are not connected only by the joint 40 described above and shown in the drawings.

DESCRIPTION OF REFERENCE CHARACTERS 10 tube with coupling
20 tube
30 leading end portion of tube
24 circumferential surface of tube
30 coupling
32 leading end portion of coupling
36 flange

What is claimed is:

1. A tube with coupling, comprising:
a coupling having a leading end portion;
the tube having a leading end portion, and the coupling being formed on the leading end portion of the tube by performing injection molding,
wherein the leading end portion of the tube is arranged at a position set back from a leading end portion of the coupling, at least a portion of the leading end portion of the tube being covered by the coupling,
the tube having an outer circumferential surface and a leading end portion, and the coupling having an inner surface, wherein the inner surface of the coupling surrounds and is fused with the outer circumferential surface and the leading end portion of the tube,
wherein the leading end portion of the coupling widens toward an outer circumference;
a flange that protrudes outward at a position set back from the leading end portion of the coupling and forward of the leading end portion of the tube;
a first recession formed on the outer circumference between the leading end portion of the coupling and the flange; and
a second recession formed on the outer circumference between the leading end portion of the tube and the flange,
the coupling being so formed as to have a wall thickness that is substantially equal at positions of both the first and second recessions.

2. The tube with coupling according to claim 1, wherein the tube and the coupling are made of tetrafluoroethylene-fluoroalkyl vinyl ether copolymer.

3. The tube with coupling according to claim 1, wherein the entire surface of the leading end of the tube is fused with the coupling, and an inner surface of the tube and a through hole of the coupling that is in communication with the inner surface are connected with no level difference therebetween.

* * * * *